United States Patent
Lee

(10) Patent No.: US 8,891,181 B2
(45) Date of Patent: Nov. 18, 2014

(54) FIXED-FOCUS PROJECTION LENS

(75) Inventor: Tsan-Haw Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 143 days.

(21) Appl. No.: 13/480,659

(22) Filed: May 25, 2012

(65) Prior Publication Data

US 2012/0300317 A1 Nov. 29, 2012

(30) Foreign Application Priority Data

May 27, 2011 (TW) .............................. 100118744 A

(51) Int. Cl.
| G02B 13/04 | (2006.01) |
| G02B 13/20 | (2006.01) |
| H04N 5/225 | (2006.01) |

(52) U.S. Cl.
CPC .............. *G02B 13/20* (2013.01); *H04N 5/2254* (2013.01); *G02B 13/04* (2013.01)
USPC ............ 359/751; 359/736; 359/745; 359/755

(58) Field of Classification Search
USPC ........... 313/371, 524; 348/335; 359/754, 751, 359/689, 708, 680, 749, 755, 357, 687, 707, 359/366, 648, 676, 738, 739, 750, 786, 793, 359/859, 713–715, 736, 745–748
See application file for complete search history.

(56) References Cited

U.S. PATENT DOCUMENTS

| 3,410,632 | A | * | 11/1968 | Woltche | ........................ | 359/751 |
| 3,634,000 | A | * | 1/1972 | Dietzsch et al. | .............. | 359/754 |
| 4,019,810 | A | * | 4/1977 | Sugiyama | ...................... | 359/751 |
| 4,101,203 | A | * | 7/1978 | Yamaguchi | .................... | 359/765 |
| 4,239,340 | A | * | 12/1980 | Ogino | .......................... | 359/675 |
| 4,767,199 | A | * | 8/1988 | Yamamoto et al. | ........... | 359/649 |
| 4,986,643 | A | * | 1/1991 | Moriyama | ..................... | 359/693 |
| 5,130,850 | A | * | 7/1992 | Toide | ............................ | 359/649 |
| 5,587,841 | A | * | 12/1996 | Ito | ................................. | 359/689 |
| 5,589,988 | A | * | 12/1996 | Suenaga | ....................... | 359/752 |
| 5,668,669 | A | * | 9/1997 | Ohtake et al. | ................. | 359/684 |
| 5,796,529 | A | * | 8/1998 | Park | ............................. | 359/756 |
| 6,008,951 | A | * | 12/1999 | Anderson | ..................... | 359/677 |
| 6,101,045 | A | * | 8/2000 | Konno et al. | .................. | 359/693 |
| 6,275,343 | B1 | * | 8/2001 | Takamoto et al. | ............. | 359/749 |
| 6,549,343 | B2 | * | 4/2003 | Yoneyama | .................... | 359/745 |
| 7,542,219 | B2 | * | 6/2009 | Saori | ............................. | 359/748 |
| 8,169,720 | B2 | * | 5/2012 | Eguchi | .......................... | 359/793 |
| 8,587,878 | B2 | * | 11/2013 | Ohashi et al. | ................. | 359/753 |

(Continued)

OTHER PUBLICATIONS

Nikon Corporation, "Exit Pupil", Dec. 9 2008. http://web.archive.org/web/20091208045934/http://www.nikon.com/products/sportoptics/how_to/guide/binoculars/basic/basic_05.htm.*

*Primary Examiner* — Thomas K Pham
*Assistant Examiner* — Collin X Beatty
(74) *Attorney, Agent, or Firm* — Tracy M. Heims; Apex Juris, pllc

(57) ABSTRACT

A fixed-focus projection lens has a first lens group and a second lens group in sequence along an optical axis from a screen side to a light modulator side. The first lens group has a positive refractive power, and the second lens group has a positive refractive power. The first lens group has two lenses, and the refractive powers of the lenses are negative and positive. The second lens group has five lenses, and the refractive powers of the lenses respectively are negative, negative, positive, positive, and positive. The fixed-focus projection lens has the features of small size and high optical performance.

11 Claims, 10 Drawing Sheets

(56) References Cited

U.S. PATENT DOCUMENTS

| | | | |
|---|---|---|---|
| 2006/0007558 A1* | 1/2006 | Hirata | 359/656 |
| 2007/0279759 A1* | 12/2007 | Hozumi et al. | 359/680 |
| 2008/0055738 A1* | 3/2008 | Chang | 359/689 |
| 2009/0109545 A1* | 4/2009 | Ohtake et al. | 359/687 |
| 2009/0161228 A1* | 6/2009 | Lee | 359/687 |
| 2009/0273851 A1* | 11/2009 | Take et al. | 359/755 |
| 2011/0007403 A1* | 1/2011 | Matsuo | 359/684 |
| 2011/0115963 A1* | 5/2011 | Sueyoshi | 348/340 |
| 2011/0317285 A1* | 12/2011 | Ohashi et al. | 359/753 |
| 2012/0062994 A1* | 3/2012 | Uchida et al. | 359/557 |

* cited by examiner

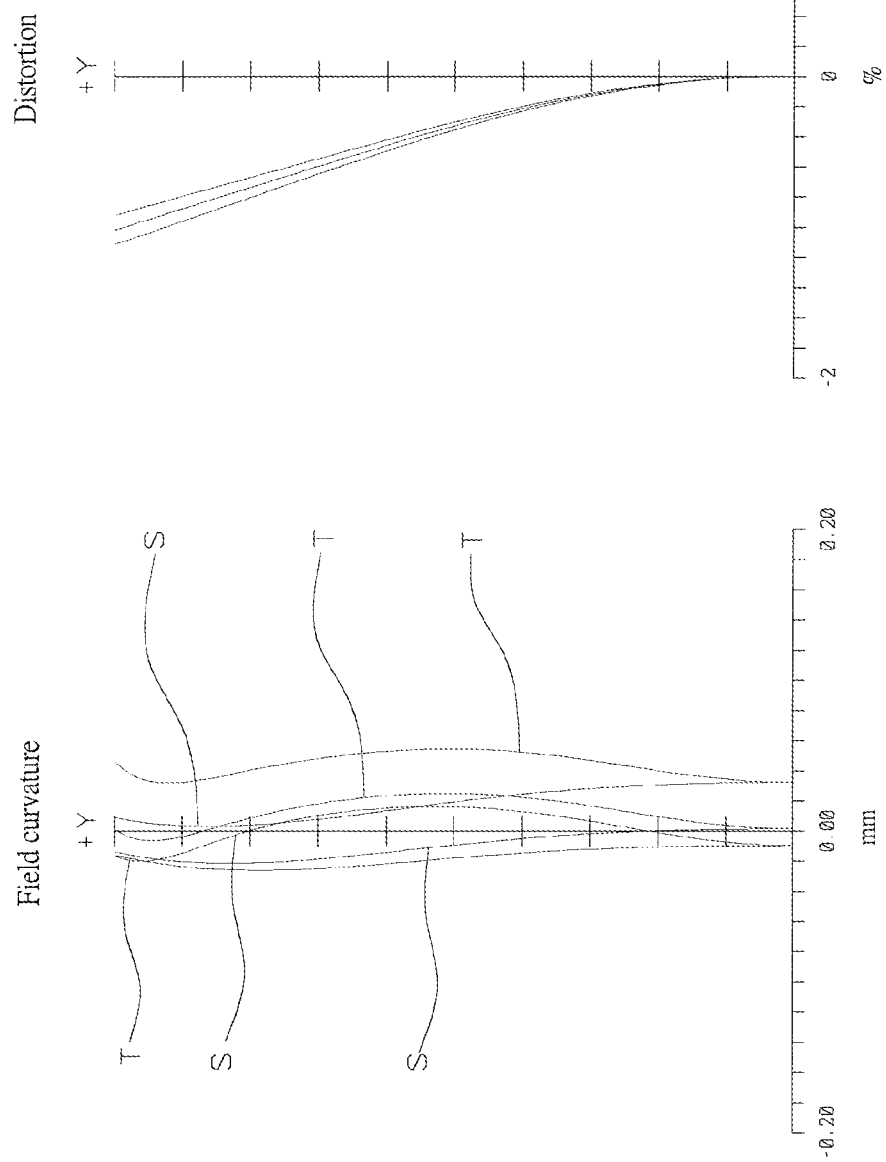

FIXED-FOCUS PROJECTION LENS

BACKGROUND OF THE INVENTION

1. Field of the Invention

The present invention relates generally to a projector, and more particularly to a fixed-focus projection lens.

2. Description of the Related Art

As the improvement of image technology, more and more people use a projector in presentation, video conference, meeting, and video watching. In order to improve the portability of the projector, the fixed-focus lens, which is mounted on the projector, is asked to be as small and light as possible. The fixed-focus lens is asked to have high optical performance also except for the weight and size to project images with high image resolution and contrast. Therefore, size and optical performance are the first two important facts for the fixed-focus lens of the projector.

In the conventional fixed-focus lens, there usually are three or more lens groups therein. Each lens group has several lenses, and the lenses are separated from each other. Consequently, the conventional fixed-focus lens is huge and heavy, and that is opposite to the modern design which requires the lens to be smaller and lighter. It takes a long time to manufacture the conventional fixed-focus lens because there are too much lenses, and of course, it has a high cost. Therefore, there still are some places that need to improve in the conventional fixed-focus lens for the projector.

SUMMARY OF THE INVENTION

The primary objective of the present invention is to provide a fixed-focus projection lens, which is small and light, and has a high optical performance.

According to the objective of the present invention, a fixed-focus projection lens has a first lens group and a second lens group in sequence along an optical axis from a screen side to a light modulator side. The first lens group has a positive refractive power, and has a first lens and a second lens in sequence from the screen side to the light modulator side. The first lens is a plastic lens and has a negative refractive power, and the second lens is a glass lens and has a positive refractive power. The second lens has a positive refractive power, and has a third lens, a fourth lens, a fifth lens, a sixth lens, and a seventh lens in sequence from the screen side to the light modulator side. The third lens is a plastic lens and has a negative refractive power; the fourth lens is a glass lens and has a negative refractive power; the fifth lens is a glass lens and has a positive refractive power, the fifth lens and the fourth lens are bonded together to form a compound lens having a negative refractive power; the sixth lens is a plastic lens and has a positive refractive power, and the seventh lens is a glass lens and has a positive refractive power.

Therefore, the fixed-focus projection lens of the present invention may have a small size and a high optical performance.

DETAILED DESCRIPTION OF THE INVENTION

The detailed description and technical contents of the present invention will be explained with reference to the accompanying drawings. However, the drawings are illustrative only but not used to limit the present invention.

First Preferred Embodiment

Figure 1:
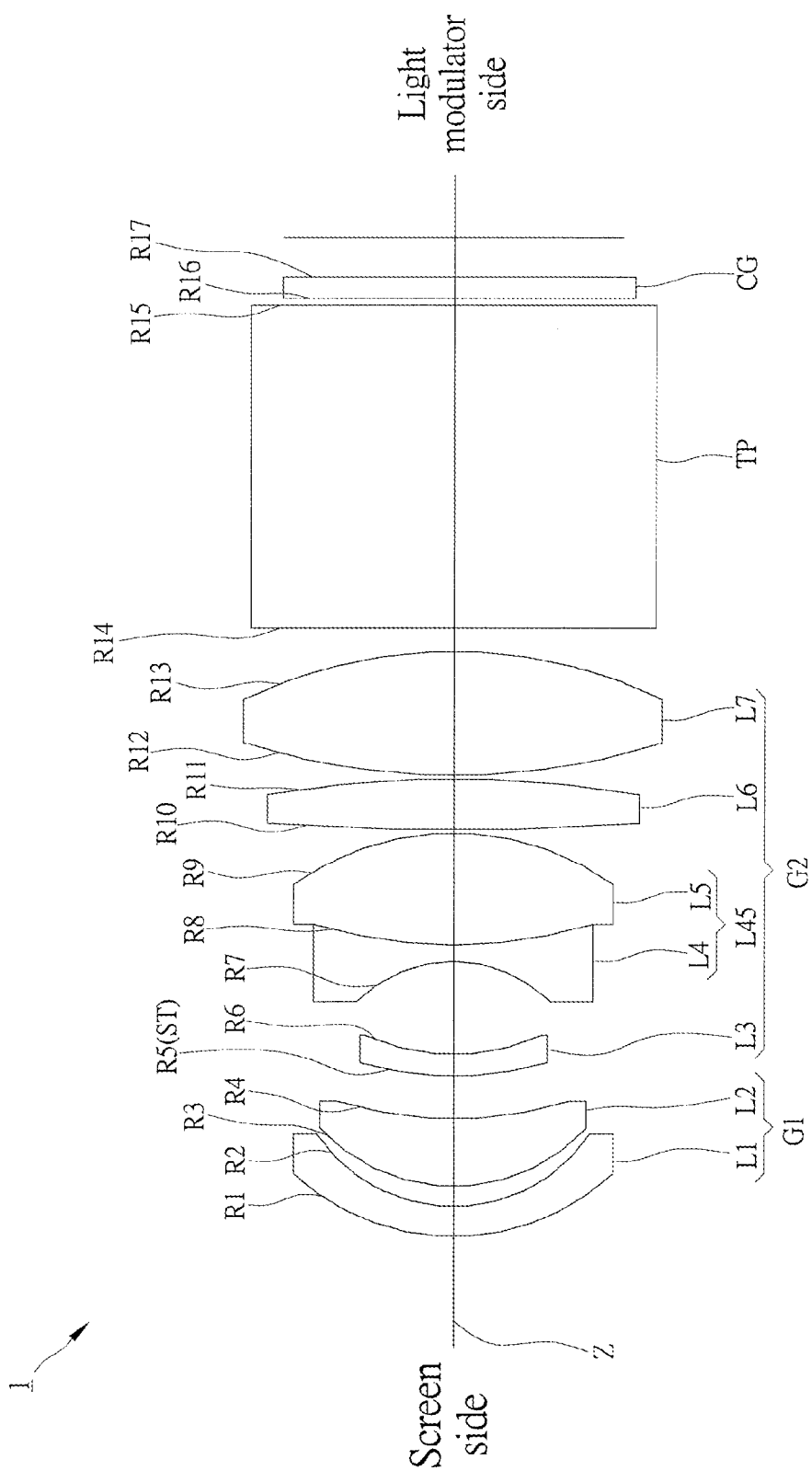
FIG. 1 is a sketch diagram of the arrangement of the lenses of a first preferred embodiment of the present invention.

FIG. 1 shows an arrangement of a fixed-focus projection lens 1 of the first preferred embodiment of the present invention, which includes a first lens group G1 and a second lens group G2 in sequence along an optical axis from a screen side to a light modulator (DMD) side. The fixed-focus projection lens 1 further has a total internal reflection prism TP and a cover glass CG between the second lens group G2 and the DMD side. The total internal reflection prism TP and the cover glass CG are conventional devices, so we do not describe their detail.

The first lens group 1 has a positive refractive power, and consists of a first lens L1 and a second lens L2 in sequence from the screen side to the DMD side. The first lens L1 is a plastic meniscus lens with a negative refractive power, and a convex side R1 thereof faces the screen side. The convex side R1 and a concave side R2 of the first lens L1 are aspheric sides. The second lens L2 is a glass meniscus lens with a positive refractive power, and a convex side R3 thereof faces the screen side.

The second lens group G2 has a positive refractive power, and consists of a third lens L3, a fourth lens L4, a fifth lens L5, a sixth lens L6, and a seventh lens L7 in sequence from the screen side to the DMD side. The third lens L3 is a plastic meniscus lens with a negative refractive power, and a convex side R5 thereof faces the screen side. The convex side R5 and a concave side R6 of the third lens L3 are aspheric sides. An aperture ST is provided on the convex side R5 of the third lens L3. The fourth lens L4 is a glass biconcave lens with a negative refractive power. The fifth lens L5 is a glass biconvex lens with a positive refractive power. The fifth lens L5 and the fourth lens L4 are bonded together to form a compound lens L45 with a negative refractive power. The sixth lens L6 a plastic biconvex lens with a positive refractive power. Both convex sides R10, R11 of the sixth lens L6 are aspheric sides. The seventh lens L7 is a glass biconvex lens with a positive refractive power.

In order to reduce the length and size of the fixed-focus projection lens 1, modify the aberration, and obtain a good optical performance, the fixed-focus projection lens 1 has the following conditions:

(1) 1.75<|F1/F|<1.83
(2) 0.80<|F2/F|<0.82
(3) 1.95<|FL1/F|<2.33
(4) 0.57<|v4/v5|<0.61

K is conic constant;
E4-E16 are coefficients of the radius of aperture H.

The conic constants (K) of the aspheric sides and the coefficients E4-E16 are shown in Table 2.

TABLE 2

|  | K | E4 | E6 | E8 | E10 | E12 | E14 | E16 |
|---|---|---|---|---|---|---|---|---|
| R1 | −3.446493 | 3.357E−04 | 2.500E−05 | −6.793E−07 | 4.112E−11 | 7.894E−10 | −2.650E−11 | 2.966E−13 |
| R2 | −1.750255 | 2.461E−04 | 8.176E−05 | −4.438E−06 | 1.240E−07 | 1.696E−09 | −2.879E−10 | 5.836E−12 |
| R5 | −4.061544 | −3.208E−03 | −8.130E−05 | 1.010E−05 | 2.464E−07 | −1.648E−08 | −2.375E−09 | 1.566E−10 |
| R6 | −3.708908 | −1.516E−03 | −1.339E−04 | 1.217E−05 | 1.253E−06 | −9.733E−08 | −5.451E−09 | 6.392E−10 |
| R10 | 64.99235 | 2.159E−04 | 7.260E−06 | 1.958E−07 | −2.533E−09 | −5.738E−11 | 1.265E−12 | −9.490E−15 |
| R11 | −4.17737 | 1.588E−04 | 9.001E−06 | 2.183E−07 | −3.053E−10 | −3.393E−11 | −1.070E−12 | 1.229E−14 |

(5) 8.50<|ex/lt|<17.0
(6) $Nd_{L2}$>1.80 where F is the focus length of the fixed-focus projection lens 1; F1 is the focus length of the first lens group G1; F2 is the focus length of the second lens group G2; FL1 is the focus length of the first lens L1; v4 is the dispersion coefficient of the fourth lens L4; v5 is that dispersion coefficient of the fifth lens L5; ex is the exit pupil position of the fixed-focus projection lens 1; lt is the length of the fixed-focus projection lens 1; and $Nd_{L2}$ is the refractive index of the second lens L2.

In order to enhance the optical performance of the fixed-focus projection lens 1, the focus length (F), F-number (FNO), radius of curvature of the lens in the optical axis Z (R), interval between the neighboring lenses (I), refractive index (Nd), and Abbe number (Vd) are shown in Table 1.

TABLE 1

| F = 11.9217 | | | | |
| FNO = 1.61 | | | | |
| R (mm) | I (mm) | Nd | Vd | |
|---|---|---|---|---|
| R1 | 5.55 | 0.90 | 1.525 | 56.40 | L1 |
| R2 | 3.62 | 0.61 | | | |
| R3 | 5.46 | 2.03 | 1.835 | 42.72 | L2 |
| R4 | 11.88 | 1.28 | | | |
| R5 | 5.73 | 0.65 | 1.632 | 23.43 | L3 |
| R6 | 4.52 | 2.79 | | | |
| R7 | −4.09 | 0.50 | 1.699 | 30.13 | L4 |
| R8 | 14.41 | 3.36 | 1.773 | 49.60 | L5 |
| R9 | −8.26 | 0.10 | | | |
| R10 | −63.0 | 1.53 | 1.525 | 56.40 | L6 |
| R11 | −13.33 | 0.10 | | | |
| R12 | 20.57 | 3.73 | 1.652 | 58.52 | L7 |
| R13 | −14.52 | 0.70 | | | |
| R14 | ∞ | 9.70 | 1.564 | 60.67 | TP |
| R15 | ∞ | 0.20 | | | |
| R16 | ∞ | 0.65 | 1.488 | 70.21 | CG |
| R17 | ∞ | 1.17 | | | |

The depression D of the aspheric sides R1, R2, S5, R6, R10 and R11 may be obtained by the following equation:

$$D = \frac{C \cdot H^2}{1 + \sqrt{1 - (1+K) \cdot C^2 \cdot H^2}} + E_4 \cdot H^4 + E_6 \cdot H^6 + E_8 \cdot H^8 + E_{10} \cdot H^{10} + E_{12} \cdot H^{12} + E_{14} \cdot H^{14} + E_{16} \cdot H^{16}$$

where:
D is the depression of the aspheric side;
C is the reciprocal of radius of curvature;
H is the radius of aperture on the surface;

The arrangement of the lenses and aperture makes the fixed-focus projection lens 1 of the first embodiment smaller and lighter, and furthermore, it still provides a good image quality, as shown in FIG. 2A to FIG. 2E.

Figure 2:
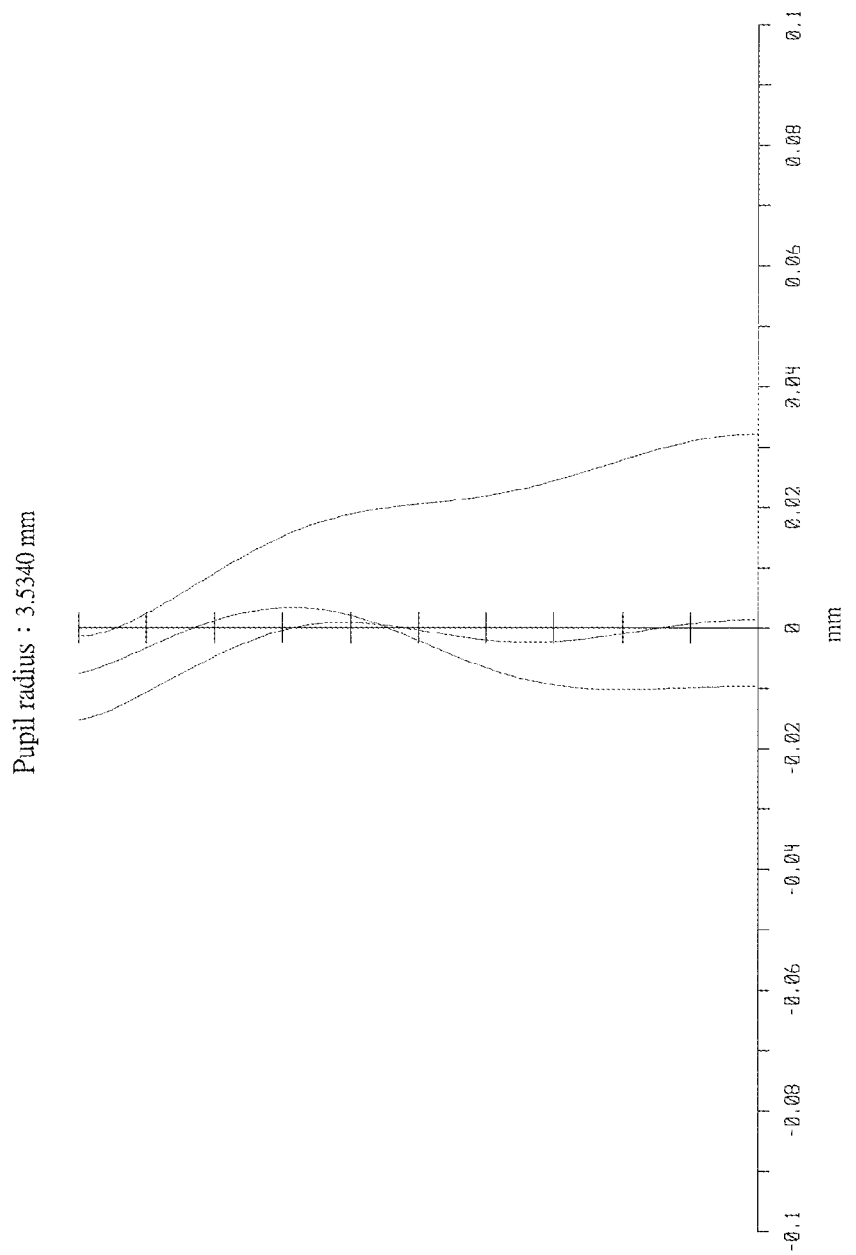
FIG. 2A is a field curvature diagram of the first preferred embodiment of the present invention.
FIG. 2B is a distortion diagram of the first preferred embodiment of the first present invention.
FIG. 2C is a longitudinal aberration diagram of the first preferred embodiment of the first present invention.
FIG. 2D is a ray fan diagram of the first preferred embodiment of the first present invention.
FIG. 2E is a spatial frequency MTF diagram of the first preferred embodiment of the present invention.
Figure 2D:
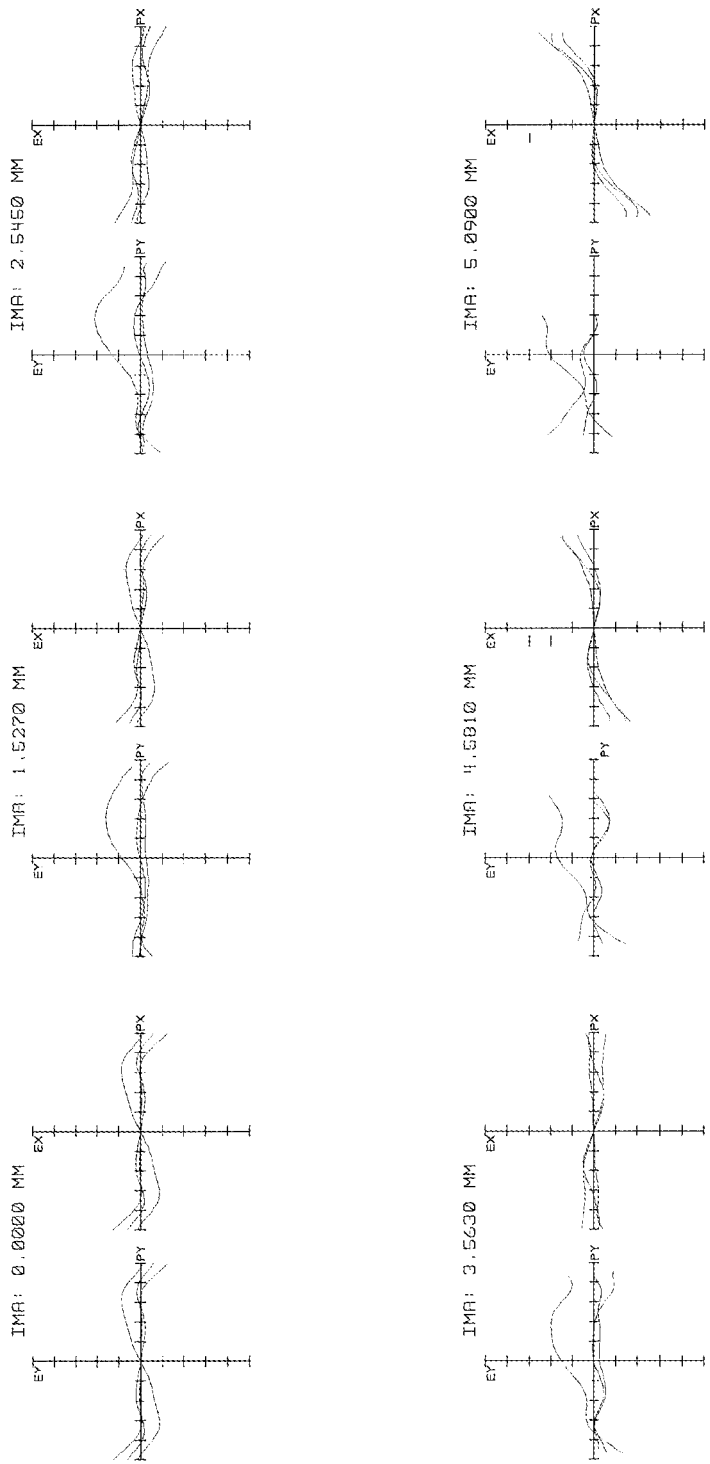
Figure 2:
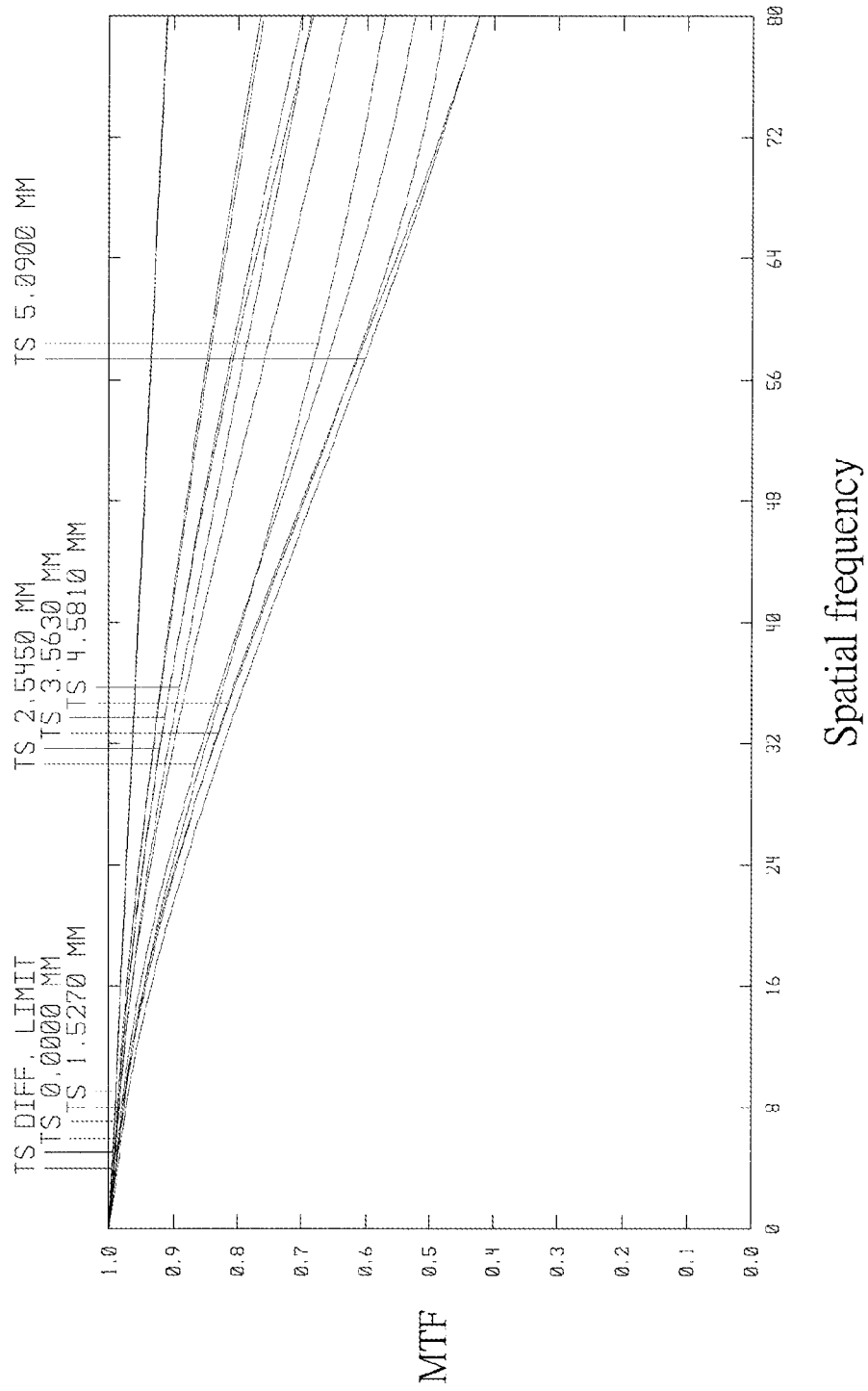

FIG. 2A is a field curvature diagram of the first preferred embodiment; FIG. 2B is a distortion diagram of the first preferred embodiment; FIG. 2C is a longitudinal aberration diagram of the first preferred embodiment; FIG. 2D is a ray fan diagram of the first preferred embodiment; and FIG. 2E is a Spatial Frequency MTF diagram of the first preferred embodiment.

FIG. 2A shows that the maximum field curvature is less than 0.06 mm and −0.04 mm, and FIG. 2B shows the maximum distortion is less than 1.2%. FIG. 2C shows the maximum longitudinal aberration is less than 0.04 mm and −0.02 mm. FIG. 2D shows the lens has a good resolution in the entire field of view. FIG. 2E shows that the MTF is greater than 40% in 80 lp/mm. All the results show that the resolution of the fixed-focus projection lens 1 of the present invention is qualified.

Second Preferred Embodiment

Figure 3:
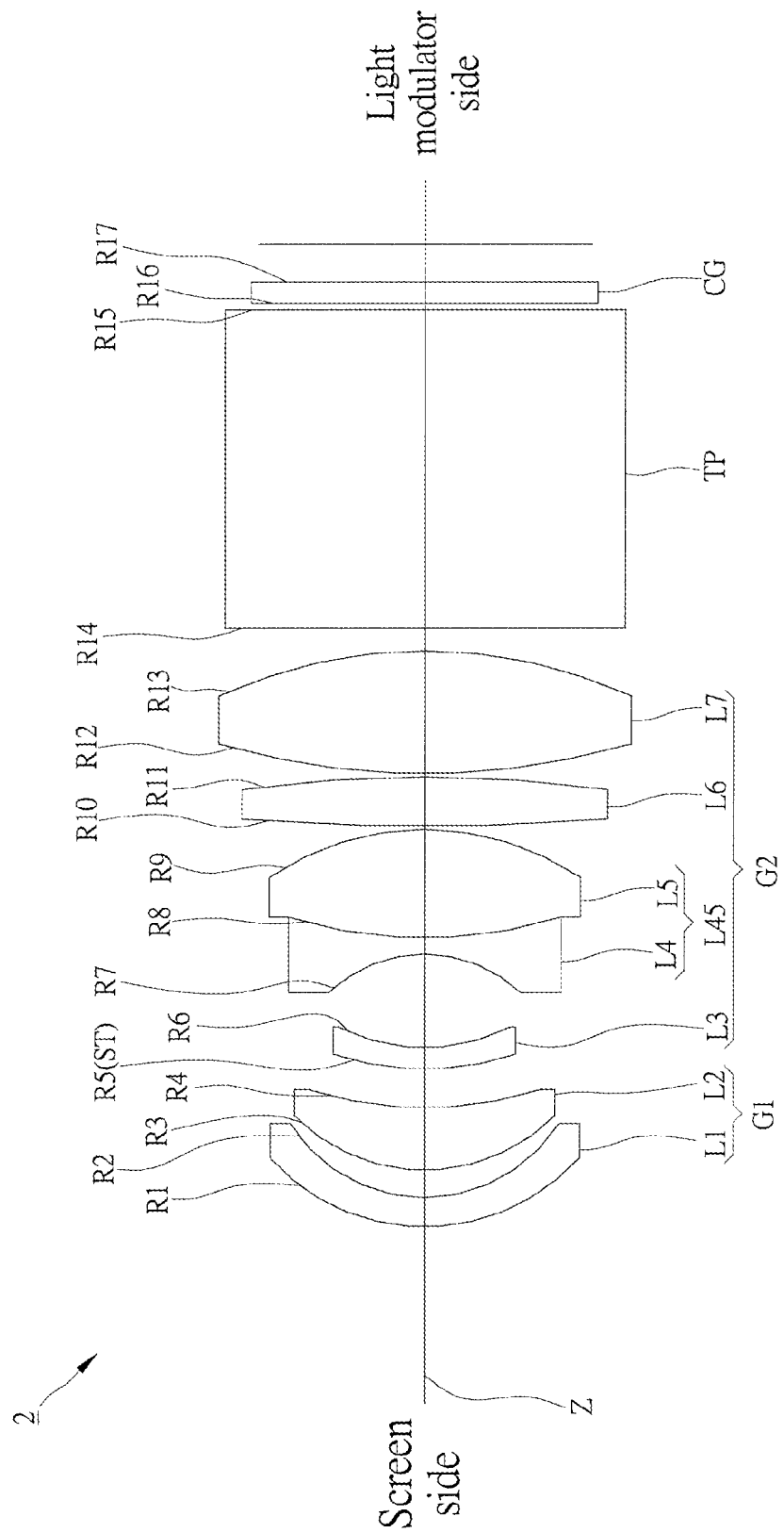
FIG. 3 is a sketch diagram of the arrangement of the lenses of a second preferred embodiment of the present invention.

FIG. 3 shows an arrangement of a fixed-focus projection lens 2 of the second preferred embodiment of the present invention, which includes a first lens group G1 and a second lens group G2 in sequence along an optical axis from a screen side to a light modulator (DMD) side. The fixed-focus projection lens 2 lens 1 further has a total internal reflection prism TP and a cover glass CG between the second lens group G2 and the DMD side.

The first lens group G1 has a positive refractive power, and has a first lens L1 and a second lens L2 in sequence from the screen side to the DMD side. The first lens L1 is a plastic meniscus lens with a negative refractive power, and a convex side R1 thereof faces the screen side. The convex side R1 and a concave side R2 of the first lens L1 are aspheric sides. The second lens L2 is a glass meniscus lens with a positive refractive power, and a convex side R3 thereof faces the screen side.

The second lens group G2 has a positive refractive power, and has a third lens L3, a fourth lens L4, a fifth lens L5, a sixth lens L6, and a seventh lens L7 in sequence from the screen side to the DMD side. The third lens L3 is a plastic meniscus lens with a negative refractive power, and a convex side R5 thereof faces the screen side. The convex side R5 and a concave side R6 of the third lens L3 are aspheric sides. An aperture ST is provided on the convex side R5 of the third lens L3. The fourth lens L4 is a glass biconcave lens with a negative refractive power. The fifth lens L5 is a glass biconvex lens with a positive refractive power. The fifth lens L5 and the fourth lens L4 are bonded together to form a compound lens L45 with a negative refractive power. The sixth lens L6 a plastic biconvex lens with a positive refractive power. Both convex sides R10, R11 of the sixth lens L6 are aspheric sides. The seventh lens L7 is a glass biconvex lens with a positive refractive power.

In order to reduce the length and size of the fixed-focus projection lens 2, modify the aberration, and obtain a good optical performance, the fixed-focus projection lens 2 has the following conditions:

(1) $1.75 < |F1/F| < 1.83$ (2) $0.80 < |F2/F| < 0.82$ (3) $1.95 < |FL1/F| < 2.33$ $$D = \frac{C \cdot H^2}{1 + \sqrt{1 - (1+K) \cdot C^2 \cdot H^2}} + E_4 \cdot H^4 + E_6 \cdot H^6 + E_8 \cdot H^8 + E_{10} \cdot H^{10} + E_{12} \cdot H^{12} + E_{14} \cdot H^{14} + E_{16} \cdot H^{16}$$

where
D is the depression of the aspheric side;
C is the reciprocal of radius of curvature;
H is the radius of aperture on the surface;
K is conic constant;
E4-E16 are coefficients of the radius of aperture H.

The conic constants (K) of the aspheric sides and the coefficients E4-E16 are shown in Table 4.

TABLE 4

| | K | E4 | E6 | E8 | E10 | E12 | E14 | E16 |
|---|---|---|---|---|---|---|---|---|
| R1 | −1.37833 | −1.069E−03 | 8.421E−05 | −2.126E−06 | −4.738E−09 | 2.952E−09 | −9.152E−11 | 9.359E−13 |
| R2 | −2.13627 | 1.319E−03 | 6.675E−06 | −8.925E−07 | 5.960E−08 | −1.669E−09 | −9.869E−12 | 2.728E−13 |
| R5 | −2.6432 | −3.729E−03 | −8.018E−05 | 1.257E−05 | 7.457E−08 | −1.888E−08 | −9.985E−10 | 7.479E−11 |
| R6 | −4.69393 | 1.297E−03 | −5.194E−04 | 4.164E−05 | 1.530E−06 | −3.914E−07 | 2.149E−08 | −3.027E−10 |
| R10 | −2.60084 | 2.489E−04 | 5.770E−06 | 2.494E−07 | −4.153E−09 | −6.183E−11 | 1.825E−12 | −1.432E−14 |
| R11 | −11.1528 | −7.058E−05 | 1.584E−05 | 1.352E−07 | −1.402E−09 | −1.674E−11 | −8.938E−13 | 1.040E−14 |

(4) $0.57 < |v4/v5| < 0.61$ (5) $8.50 < |ex/lt| < 17.0$ (6) $Nd_{L2} > 1.80$ where F is the focus length of the fixed-focus projection lens 2; F1 is the focus length of the first lens group G1; F2 is the focus length of the second lens group G2; FL1 is the focus length of the first lens L1; v4 is the dispersion coefficient of the fourth lens L4; v5 is the dispersion coefficient of the fifth lens L5; ex is the exit pupil position of the fixed-focus projection lens 2; lt is the length of the fixed-focus projection lens 2; and $Nd_{L2}$ is the refractive index of the second lens L2.

In order to enhance the optical performance of the fixed-focus projection lens 2, the focus length (F), F-number (FNO), radius of curvature of the lens in the optical axis Z (R), interval between the neighboring lenses (I), refractive index (Nd), and Abbe number (Vd) are shown in Table 3.

TABLE 3

F = 11.9253
FNO = 1.63

| | R (mm) | I (mm) | Nd | Vd | |
|---|---|---|---|---|---|
| R1 | 4.99 | 0.90 | 1.525 | 56.40 | L1 |
| R2 | 3.49 | 0.837 | | | |
| R3 | 5.65 | 1.90 | 1.835 | 42.72 | L2 |
| R4 | 11.77 | 1.176 | | | |
| R5 | 5.16 | 0.66 | 1.586 | 29.91 | L3 |
| R6 | 4.14 | 2.854 | | | |
| R7 | −4.30 | 0.50 | 1.728 | 28.46 | L4 |
| R8 | 14.11 | 3.31 | 1.773 | 49.60 | L5 |
| R9 | −8.49 | 0.10 | | | |
| R10 | −57.32 | 1.50 | 1.525 | 56.40 | L6 |
| R11 | −13.96 | 0.10 | | | |
| R12 | 22.20 | 3.75 | 1.729 | 54.68 | L7 |
| R13 | −15.04 | 0.70 | | | |
| R14 | ∞ | 9.70 | 1.564 | 60.67 | TP |
| R15 | ∞ | 0.20 | | | |
| R16 | ∞ | 0.65 | 1.488 | 70.21 | CG |
| R17 | ∞ | 1.163 | | | |

The depression D of the aspheric sides R1, R2, R5, R6, R10 and R11 may be obtained by the following equation:

The arrangement of the lenses and aperture makes the fixed-focus projection lens 2 of the second embodiment smaller and lighter, and furthermore, it still provides a good image quality, as shown in FIG. 4A to FIG. 4E.

Figure 4:
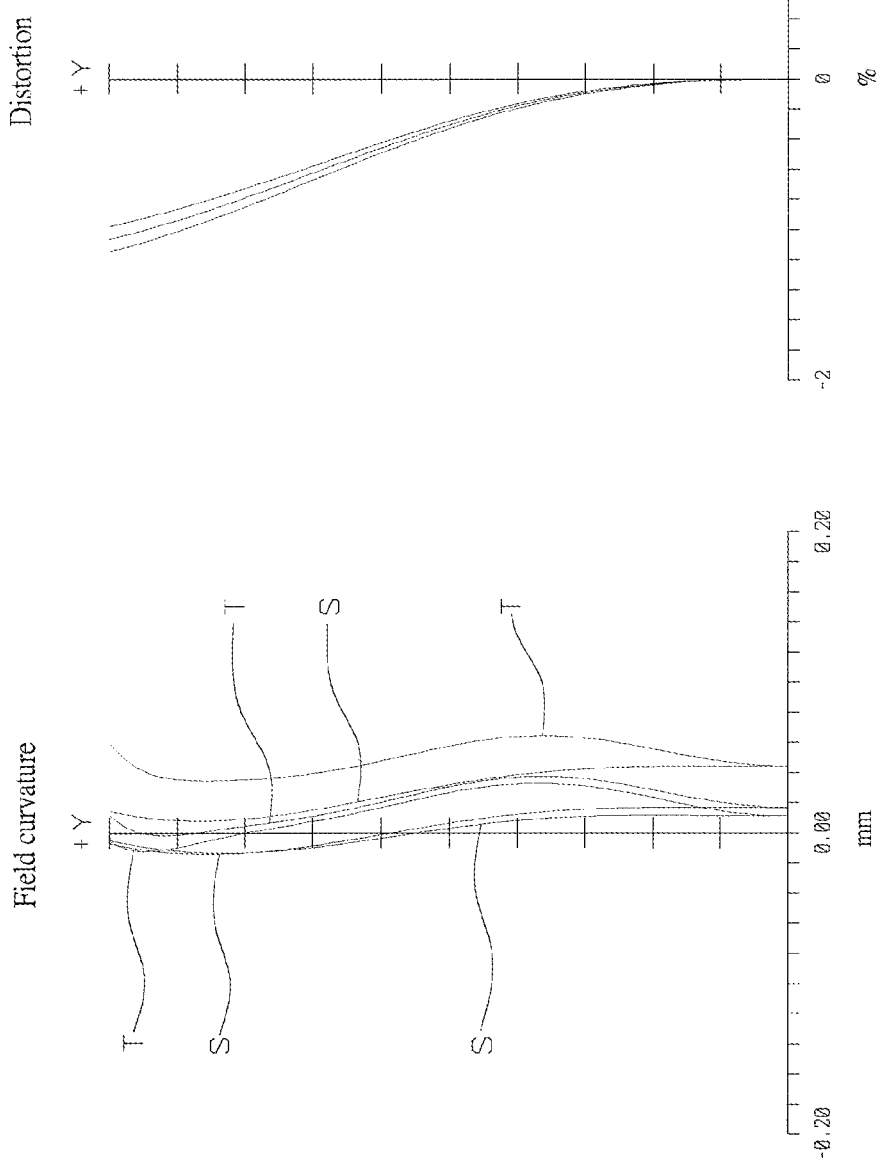
FIG. 4A is a field curvature diagram of the second preferred embodiment of the present invention.
FIG. 4B is a distortion diagram of the second preferred embodiment of the second present invention.
FIG. 4C is a longitudinal aberration diagram of the second preferred embodiment of the second present invention.
FIG. 4D is a ray fan diagram of the second preferred embodiment of the first present invention.
FIG. 4E is a spatial frequency MTF diagram of the second preferred embodiment of the present invention.
Figure 4:
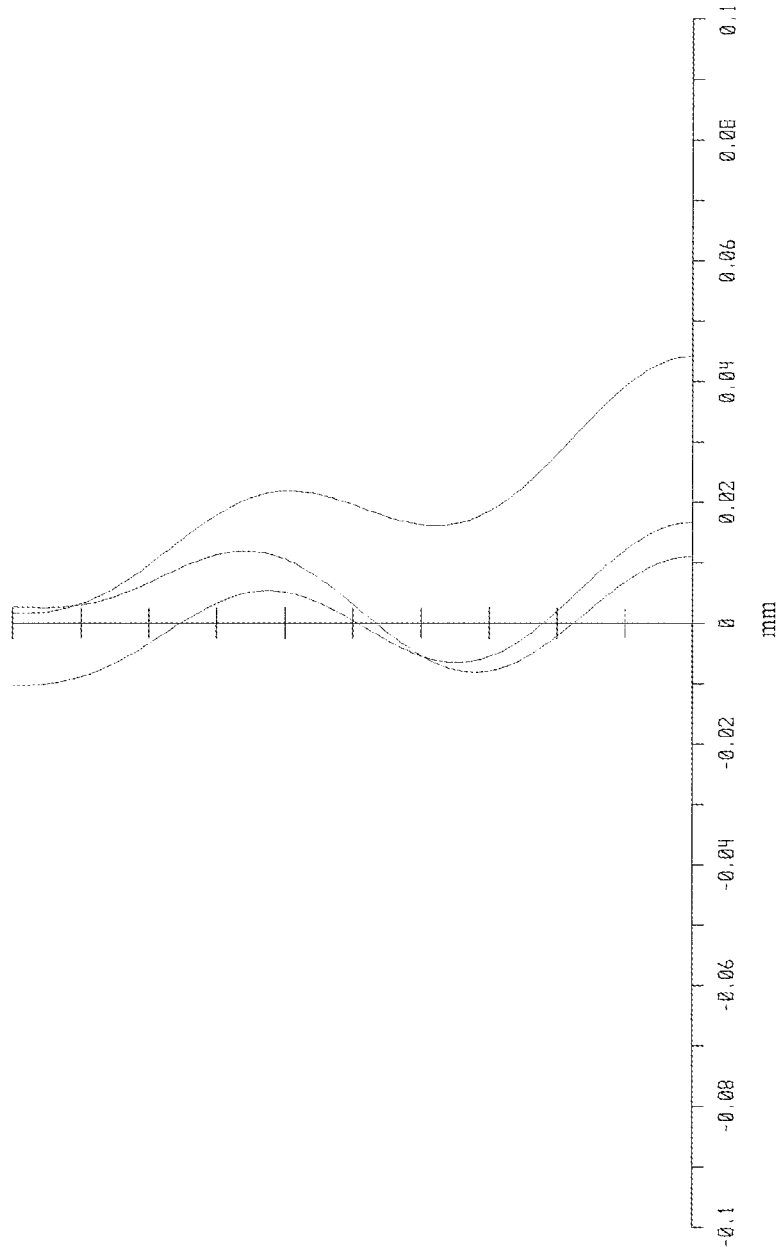
Figure 4D:
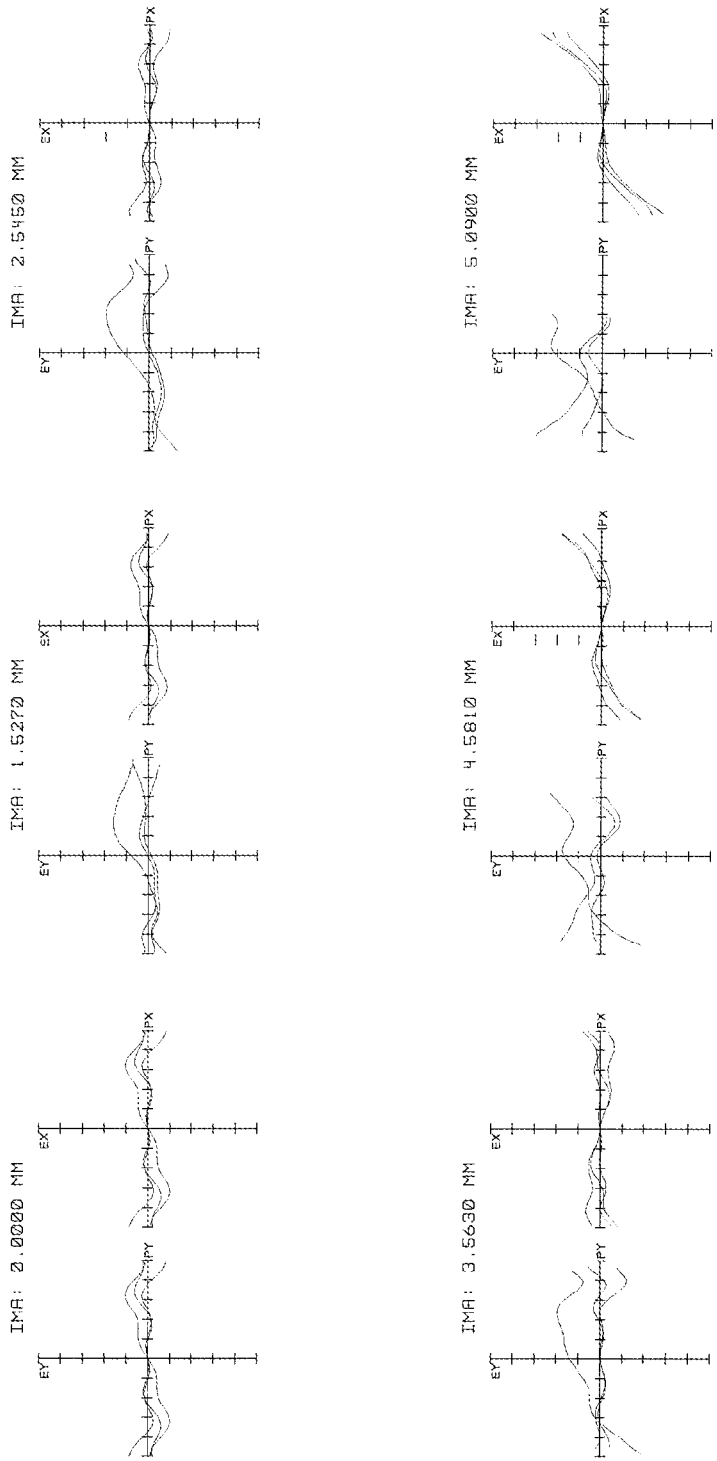
Figure 4:
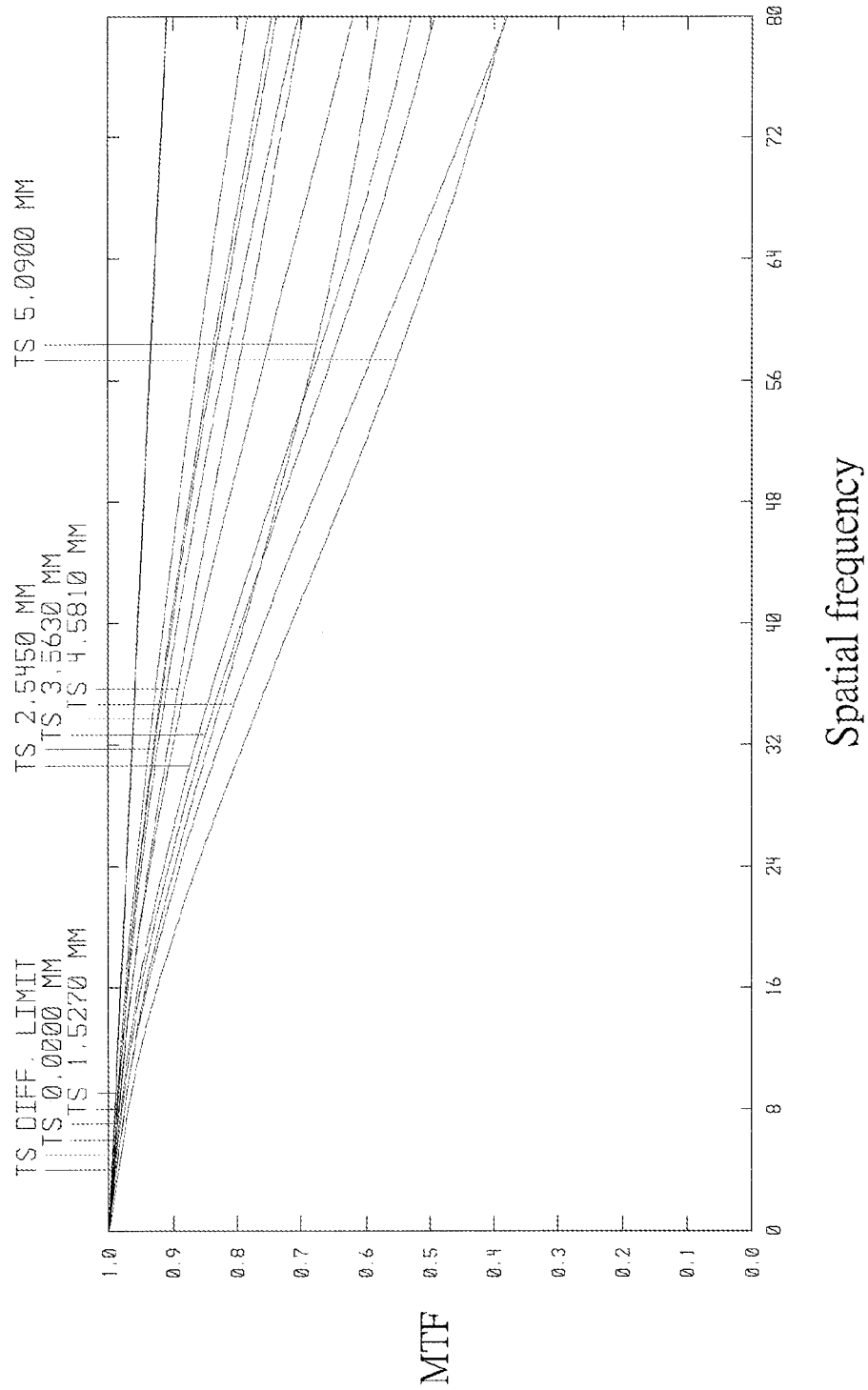

FIG. 4A is a field curvature diagram of the second preferred embodiment; FIG. 4B is a distortion diagram of the second preferred embodiment; FIG. 4C is a longitudinal aberration diagram of the second preferred embodiment; FIG. 4D is a ray fan diagram of the second preferred embodiment; and FIG. 4E is a Spatial Frequency MTF diagram of the second preferred embodiment.

FIG. 4A shows that the maximum field curvature is less than 0.08 mm and −0.02 mm, and FIG. 4B shows the maximum distortion is less than 1.2%. FIG. 4C shows the maximum longitudinal aberration is less than 0.05 mm and −0.02 mm. FIG. 4D shows the lens has a good resolution in the entire field of view. FIG. 4E shows that the MTF is greater than 30% in 80 lp/mm. All the results show that the resolution of the fixed-focus projection lens 2 of the present invention is qualified.

In conclusion, the fixed-focus projection lens of the present invention has the features of small size and high optical performance.

The description above is a few preferred embodiments of the present invention and the equivalence of the present invention is still in the scope of claim construction of the present invention.

What is claimed is:

1. A fixed-focus projection lens, in sequence along an optical axis from a screen side to a light modulator side, comprising:
   a first lens group, which has a positive refractive power, and has a first lens and a second lens in sequence from the screen side to the light modulator side, wherein the first lens is a plastic lens and has a negative refractive power, and the second lens is a glass lens and has a positive refractive power; and
   a second lens group, which has a positive refractive power, and has a third lens, a fourth lens, a fifth lens, a sixth lens, and a seventh lens in sequence from the screen side to the light modulator side, wherein the third lens is a plastic lens and has a negative refractive power; the fourth lens is a glass lens and has a negative refractive power; the fifth lens is a glass lens and has a positive refractive power, the fifth lens and the fourth lens are bonded together to form a compound lens having a negative refractive power; the sixth lens is a plastic lens and has a positive refractive power, and the seventh lens is a glass lens and has a positive refractive power;

wherein the third lens has a convex side which faces the screen side;

wherein the seventh lens is a single lens; and wherein the second lens is arranged alongside the first lens.

2. The fixed-focus projection lens as defined in claim 1, wherein the first lens has at least an aspheric side.

3. The fixed-focus projection lens as defined in claim 1, wherein a refractive index of the second lens is greater than 1.80.

4. The fixed-focus projection lens as defined in claim 1, wherein the third lens has at least an aspheric side.

5. The fixed-focus projection lens as defined in claim 1, further comprising an aperture provided on a side of the third lens which faces the screen side.

6. The fixed-focus projection lens as defined in claim 1, wherein the sixth lens has at least an aspheric side.

7. The fixed-focus projection lens as defined in claim 1, wherein the fixed-focus projection lens has a condition of $1.75<|F1/F|<1.83$, where F is a focus length of the fixed-focus projection lens and F1 is a focus length of the first lens group.

8. The fixed-focus projection lens as defined in claim 1, wherein the fixed-focus projection lens has a condition of $0.80<|F2/F|<0.82$, where F is a focus length of the fixed-focus projection lens and F2 is a focus length of the second lens group.

9. The fixed-focus projection lens as defined in claim 1, wherein the fixed-focus projection lens has a condition of $1.95<|FL1/F|<2.33$, where F is a focus length of the fixed-focus projection lens and FL1 is a focus length of the first lens.

10. The fixed-focus projection lens as defined in claim 1, wherein the fixed-focus projection lens has a condition of $0.57<|v4/v5|<0.61$, where v4 is a dispersion coefficient of the fourth lens; v5 is a dispersion coefficient of the fifth lens.

11. The fixed-focus projection lens as defined in claim 1, wherein the fixed-focus projection lens has a condition of $8.50<|ex/lt|<17.0$, where ex is a exit pupil position of the fixed-focus projection lens and lt is a length of the fixed-focus projection lens.

* * * * *